(12) United States Patent
Vasseur et al.

(10) Patent No.: US 8,489,765 B2
(45) Date of Patent: Jul. 16, 2013

(54) DYNAMIC DIRECTED ACYCLIC GRAPH (DAG) ADJUSTMENT

(75) Inventors: Jean-Philippe Vasseur, Saint Martin dUriage (FR); Navneet Agarwal, Bangalore (IN); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 536 days.

(21) Appl. No.: 12/790,060

(22) Filed: May 28, 2010

(65) Prior Publication Data

US 2011/0231573 A1     Sep. 22, 2011

(51) Int. Cl.
*G06F 15/16* (2006.01)
*G06F 12/00* (2006.01)

(52) U.S. Cl.
USPC ........................................ 709/238; 709/250

(58) Field of Classification Search
USPC ................................. 709/203, 238–242, 250
See application file for complete search history.

(56) References Cited

U.S. PATENT DOCUMENTS

| | | | |
|---|---|---|---|
| 6,122,272 A | 9/2000 | Tomaszewski et al. | |
| 6,836,462 B1 | 12/2004 | Albert et al. | |
| 7,020,090 B2 | 3/2006 | Chandwadkar et al. | |
| 7,302,482 B2 | 11/2007 | Rodosek et al. | |
| 7,401,159 B1 | 7/2008 | Aviani et al. | |
| 7,477,601 B1 | 1/2009 | Waclawsky et al. | |
| 7,551,569 B2 | 6/2009 | Vasseur | |
| 7,693,055 B2 | 4/2010 | Vasseur et al. | |
| 7,693,064 B2 * | 4/2010 | Thubert et al. | 370/235 |
| 7,701,940 B2 | 4/2010 | Novello et al. | |
| 7,706,281 B2 | 4/2010 | Dalal et al. | |
| 7,719,974 B2 | 5/2010 | Chandwadkar et al. | |
| 8,270,313 B2 * | 9/2012 | Tao et al. | 370/252 |
| 2004/0225868 A1 * | 11/2004 | Kim et al. | 712/214 |
| 2006/0168168 A1 | 7/2006 | Xia et al. | |
| 2006/0265347 A1 | 11/2006 | Caballero-McCann et al. | |
| 2007/0081454 A1 | 4/2007 | Bergamasco et al. | |
| 2007/0091811 A1 | 4/2007 | Thubert et al. | |
| 2007/0177506 A1 | 8/2007 | Singer et al. | |
| 2009/0216910 A1 | 8/2009 | Duchesneau | |
| 2009/0254874 A1 * | 10/2009 | Bose | 716/6 |
| 2011/0228696 A1 * | 9/2011 | Agarwal et al. | 370/253 |
| 2011/0228788 A1 * | 9/2011 | Thubert et al. | 370/400 |

OTHER PUBLICATIONS

Thubert, P., RPL Objective Function 0, draft-ietf-roll-of0-01, Network Working Group, Internet Draft, Feb. 18, 2010, 9 pages.

(Continued)

*Primary Examiner* — Zarni Maung
(74) *Attorney, Agent, or Firm* — Cesari and McKenna, LLP

(57) ABSTRACT

In one embodiment, a root device may request that one or more devices of a computer network build a directed acyclic graph (DAG) for routing traffic within the computer network based on an objective function (OF), where the OF has one or more metrics to optimize the DAG against and optionally certain constraints. Particular devices that receive the request may then build the DAG based on the OF, and may determine and report OF feedback to the root device. Upon receiving the reports regarding OF feedback, the root device may then adjust the OF based on the feedback, and request a rebuild of the DAG from the devices based on the adjusted OF.

24 Claims, 7 Drawing Sheets

OTHER PUBLICATIONS

Vasseur, et al., Routing Metrics Used for Path Calculation in Low Power and Lossy Networks, draft-ietf-roll-routing-metrics-04, Network Working Group, Internet Draft, Dec. 3, 2009, 30 pages.

Winter, et al., RPL: IPv6 Routing Protocol for Low Power and Lossy Networks, draft-ietf-roll-rpl-07, Network Working Group, Internet Draft, Mar. 8, 2010, 83 pages.

PCT Notification of Transmittal of the international Search Report and the Written Opinion of the International Searching Authority, or the Declaration, International Searching Authority, International Application No. PCT/US2011/00490, mailed May 12, 2011, 10 pages.

* cited by examiner

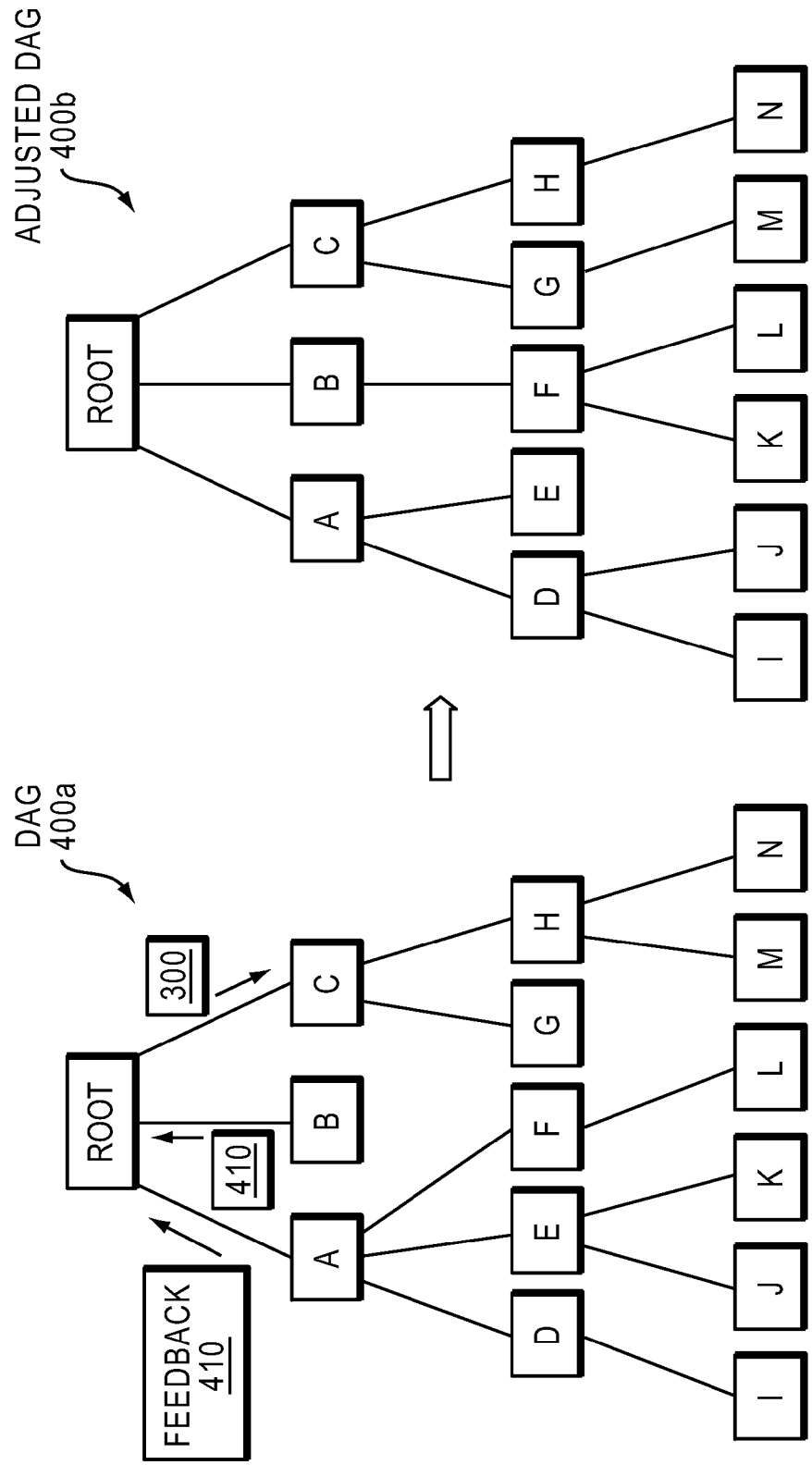

DYNAMIC DIRECTED ACYCLIC GRAPH (DAG) ADJUSTMENT

RELATED APPLICATION

The present invention claims priority to commonly owned Indian Patent Application Serial No. 644/DEL/2010, entitled DYNAMIC DIRECTED ACYCLIC GRAPH (DAG) ADJUSTMENT, by Vasseur, et al., on Mar. 19, 2010, the contents of which are incorporated by reference

TECHNICAL FIELD

The present disclosure relates generally to computer networks, and, more particularly, to directed acyclic graph (DAG) routing, e.g., for Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG) in addition to a set of features to bound the control traffic, support local (and slow) repair, etc. The RPL architecture provides a flexible method by which each node performs DODAG discovery, construction, and maintenance.

One of the core aspects building a DAG, particularly in the case of RPL, lies in the use of an Objective Function (OF) configured on a DAG root that dictates a set of rules according to which nodes build (join) the DAG. That is, the OF specifies the list of metrics and constraints used to build the DAG, in addition to a number of rules and objectives. For example, one example OF may be to find a shortest path based on some reliability metric (thus, the most reliable path), while avoiding battery operated nodes. Another example OF could specify to find a shortest path based on a delay metric (thus, the shortest delay), while using encrypted links.

Generally, it is extremely difficult to know a priori the shape of a DAG, essentially because of the looseness of the network, the physical topology of the network (especially when interconnected with low power wireless links), and unpredictable quality of the links. With current approaches to setting an OF, it is possible to end up with a DAG that will not satisfy requirements of the DAG's end nodes or root. As one example, if the chosen objective is to find the shortest path according to some strict constraints (e.g., build for optimality), this may lead to limited connectivity, and thus poor load balancing of congested links (e.g., resulting in poor scalability).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A and 4B illustrate an example directed acyclic graph (DAG)/tree, message exchange, and DAG adjustment.

DESCRIPTION OF EXAMPLE EMBODIMENTS

Overview

Figure 1:
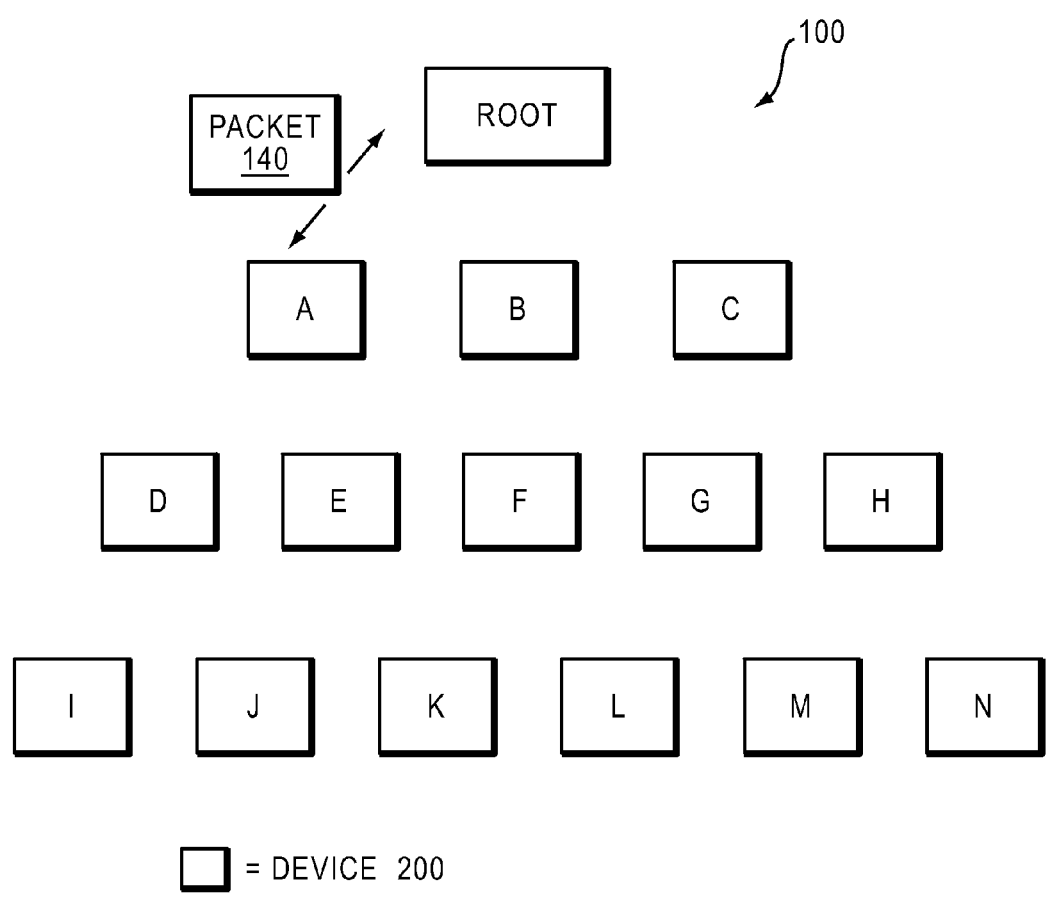
FIG. 1 illustrates an example computer network.

According to one or more embodiments of the disclosure, a root device may request that one or more devices of a computer network build a directed acyclic graph (DAG) for routing traffic within the computer network based on an objective function (OF), where the OF has one or more metrics to optimize the DAG against and optionally certain constraints. Particular devices that receive the request may then build the DAG based on the OF, and may determine and report OF feedback to the root device. Upon receiving the reports regarding OF feedback, the root device may then adjust the OF based on the feedback, and request a rebuild of the DAG from the devices based on the adjusted OF.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC). In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart object in LLNs are actuators, e.g., responsible for turning on/off an engine or perform any other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200, such as, e.g., routers, sensors, computers, etc., interconnected by various methods of communication (e.g., labeled as "A" through "N"). For instance, the links may be wired links or may comprise a wireless communication medium, where certain nodes 200 may be in communication with other nodes 200, e.g., based on distance, signal strength, current operational status, location, etc. Those skilled in the art will understand that any number of nodes, devices, links, etc. may be used in the computer network, and that the view shown herein is for simplicity. Illustratively, certain devices in the network may be more capable than others, such as those devices having larger memories, sustainable non-battery power supplies, etc., versus those devices having minimal memory, battery power, etc. For instance, as noted below, certain devices 200 may have no or limited memory capability, as denoted by the dashed circles. As described further herein, one or more of the devices 200 may be considered "root nodes/devices," while one or more of the devices may also be considered "destination nodes/devices."

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets 140-s, as described below.

Figure 2:
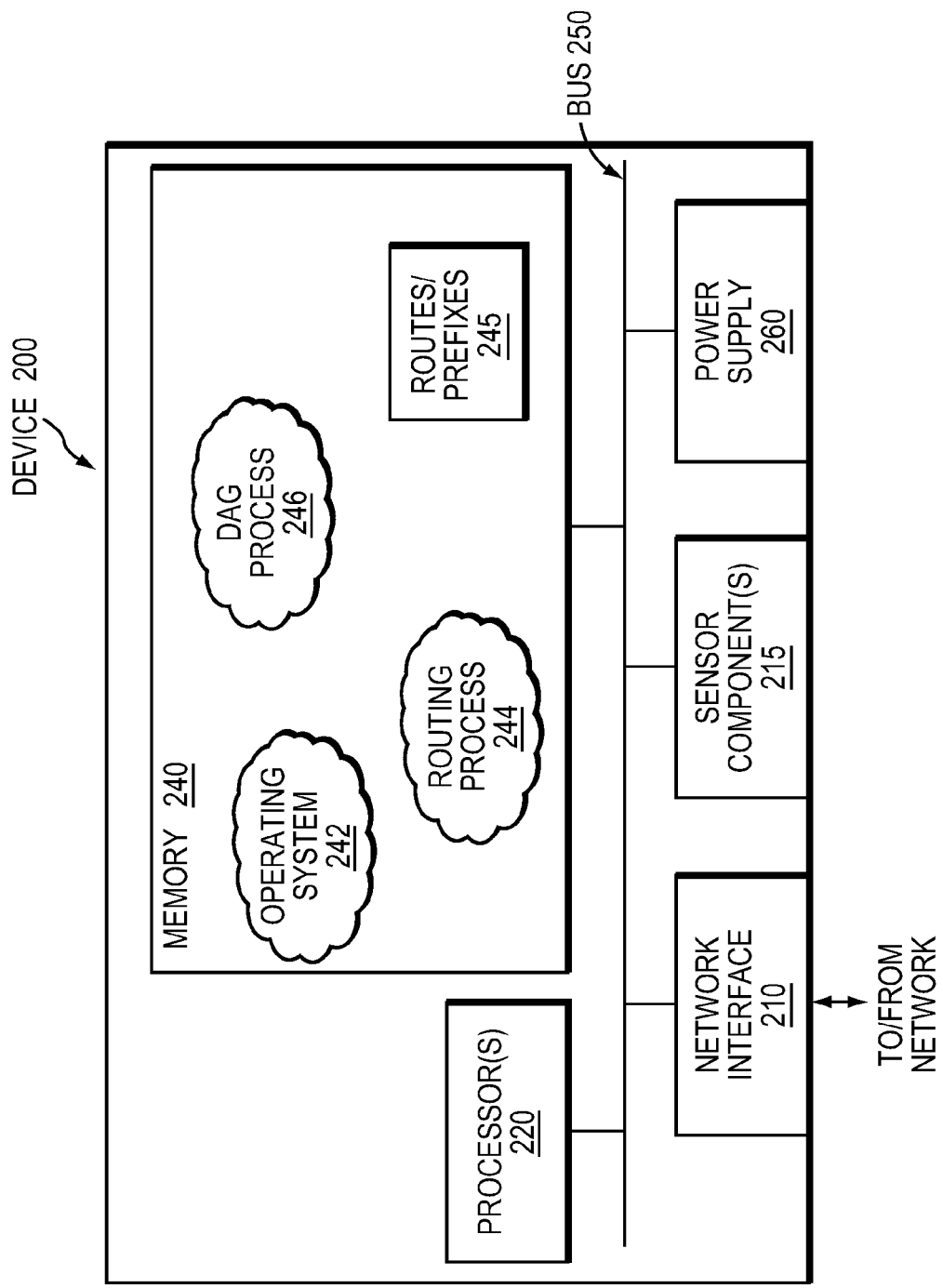
FIG. 2 illustrates an example network device/node.

FIG. 2 is a schematic block diagram of an example node/device 200 that may be used with one or more embodiments described herein, e.g., as a device or sensor. The device may comprise one or more network interfaces 210, one or more sensor components 215, a processor 220 (e.g., an 8-64 bit microcontroller), and a memory 240 interconnected by a system bus 250, as well as a power supply 260 (e.g., battery, plug-in, etc.). The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, powerline communication (PLC) protocols, etc.

The memory 240 comprises a plurality of storage locations that are addressable by the processor(s) 220 and the network interfaces 210 for storing software programs and data structures associated with the embodiments described herein. As noted above, certain devices may have limited memory or no memory (e.g., no memory for storage other than for programs/processes operating on the device). The processors 220 may comprise necessary elements or logic adapted to execute the software programs and manipulate the data structures, such as routes or prefixes 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. It will be apparent to those skilled in the art that other processor and memory types, including various computer-readable media, may be used to store and execute program instructions pertaining to the techniques described herein.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets 140-s, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rp1-07> by Winter, et al. (Mar. 8, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG is defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG has one parent or, as used herein, one preferred parent.

DAGs may generally be built based on an Objective Function (OF), which defines a set of routing metrics, optimization objectives, constraints, and related functions are in use in a DAG. That is, role of the Objective Function is to specify one or more metrics to optimize the DAG against, as well as how these are used to compute a best (e.g., shortest) path. Also, the OF may include an optional set of constraints to compute a constrained path, such as where if a link or a node does not satisfy a required constraint, it is "pruned" from the candidate list when computing the best path. Additionally, OFs may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function, it may be configured to join a DAG as a leaf node.

Illustratively, example metrics used to select paths (e.g., preferred parents) based on an OF may comprise cost, delay, latency, bandwidth, estimated transmission count (ETX), etc., while example constraints that may be placed on the route selection may comprise various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). Notably, an example for how routing metrics may be obtained may be found in an IETF Internet Draft, entitled "Routing Metrics used for Path Calculation in Low Power and Lossy Networks"<draft-ietf-roll-routing-metrics-04> by Vasseur, et al. (Dec. 3, 2009 version). Further, an example OF (e.g., a default OF) may be found in an IETF Internet Draft, entitled "RPL Objective Function 0"<draft-ietf-roll-of0-01> by Thubert (Feb. 18, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery request message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop address to a reverse route record stack (e.g., a "Reverse Route Stack" contained within a RPL DAO message). The reverse route record stack may then be subsequently used to generate piecewise source routes (for packets 140-*s*) over regions of the DAG that are incapable of storing downward routing state.

Figure 3:
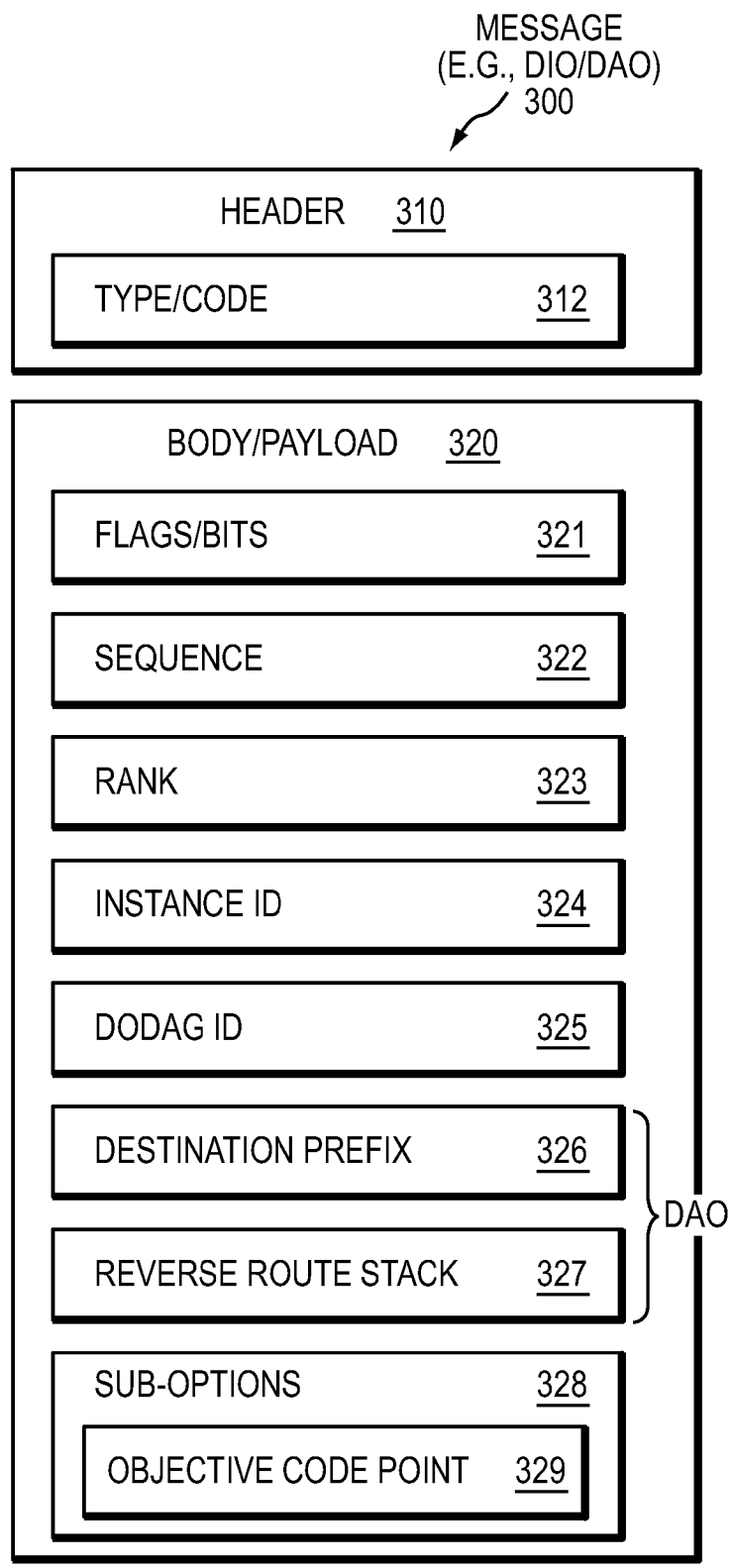
FIG. 3 illustrates an example message.

FIG. 3 illustrates an example simplified control message format 300 that may be used for discovery and route dissemination when building a DAG, e.g., as a DIO or DAO. Message 300 illustrative comprises a header 310 within one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, and a DAG ID 325, and other fields, each as may be appreciated in more detail by those skilled in the art. Further, for DAO messages, additional fields for destination prefixes 326 and a reverse route stack 400 may also be included. For either DIOs or DAOs, one or more additional sub-option fields 328 may be used to supply additional or custom information within the message 300. For instance, an objective code point (OCP) sub-option field 329 may be used within a DIO to carry codes specifying a particular objective function (OF) to be used for building the associated DAG.

As noted above, objective functions dictate a set of rules according to which nodes build (join) the DAG, such that by using defined OFs that are understood by all nodes in a particular deployment, and by referencing these in the DIO message (OCP 329), nodes may build LLN routes using a variety of application and implementation specific metrics and goals. However, as mentioned, it is extremely difficult to know a priori the shape of a DAG, and it is possible to end up with a DAG that will not satisfy various requirements of the DAG's end nodes or root. For example, while a certain OF may indicate selection of fastest path that avoids battery powered devices, the end result, e.g., in a primarily battery powered network, may be few compliant routing connections, leading to high congestion, which may further lead to added delays or even dropped packets. Often, once a disappointing DAG such as this is built, these and/or other results may remain hidden or elusive to the original selector of the OF (e.g., typically a system administrator), and the DAG may remain utilized in its generally unchanged design.

Dynamic DAG Adjustment

According to one or more embodiments of the disclosure, a root device may request that a DAG be built based on an objective function (OF) that has one or more metrics to optimize the DAG against and optionally certain constraints. Devices that receive the request may then build the DAG based on the OF, and may determine and report OF feedback to the root device. Upon receiving the reports regarding OF feedback, the root device may then adjust the OF based on the feedback, and request a rebuild of the DAG from the devices based on the adjusted OF.

Illustratively, the techniques described herein may be performed by hardware, software, and/or firmware, such as in accordance with a DAG process 246, which may contain computer executable instructions executed by the processor 220 of either a root device or a device within the DAG to perform functions relating to the novel techniques described herein, e.g., in conjunction with routing process 244. For instance, the DAG root (e.g., typically a router) plays a key role in the flexible DAG formation by selecting the OF, and thus greatly influencing the DAG shape as it is built by the distributed routing protocol operating on the DAG devices based on the device feedback.

Operationally, a root device of a DAG may request the creation of a DAG based on a certain OF, as described above, such as through a DAG discovery request (e.g., DIO) 300. For instance, the OF may include (or otherwise indicate, e.g., OCP 329) rules on how to select one or more preferred parent devices for the DAG. For example, metrics may comprise delay, latency, bandwidth, estimated transmission count (ETX), and cost, while constraints, if used, may comprise various reliability thresholds, restrictions on battery operation, multipath diversity, load balancing requirements, bandwidth requirements, transmission types (wired, wireless, etc.), and number of selected parents. Devices 200 of the network may then receive the request, and in a generally conventional manner, may build its portion of the DAG, that is, select its preferred parent(s), based on the OF included in the request. Notably, the included OF may actually consist of a default OF, or no OF, in which case the receiving devices operate in a configured manner to handle requests without specified OFs.

Objective Function feedback may be determined by the devices of the DAG either in response to the initial building of the DAG, or at a later time, such as when metrics or other values (e.g., remaining power) change, such as beyond certain pre-set thresholds. For instance, where the OF contains a restriction on allowing battery operated devices to function as routers, a battery operated device may quickly determine that it has not met the constraint. Conversely, if the OF contains a provision based on latency, a feedback may be determined in response to a detected increase in latency beyond some threshold. As an alternative or additional description, feedback may be determined/triggered in response to determining some encountered problem on a device, such as an inability to meet certain constraints, a metric that has changed beyond a threshold, and so on. These examples are merely illustrative, and other triggers for feedback may occur within the embodiments herein, accordingly, in order to provide path quality reports, relevant information, etc.

FIG. 4A illustrates the network 100 of FIG. 1 showing a constructed DAG 400*a* after a DAG discovery message (e.g., DIO) 300, and one or more OF feedback messages 410 transmitted (reported) by the devices toward the root device. Illustratively, the feedback messages 410 may be a specific message designed to carry feedback information, or may be another suitable message, such as a DAG discovery reply (e.g., DAO) message, for example, utilizing a sub-option field 328. Notably, determining and returning feedback may be a standard operating procedure, or may be specifically requested from the root, such as in bits/flags 321, OCP 329, or other suitable field capable of indicating the root device's desire to receive feedbacks or at least its ability to understand them. Additionally, a specific feedback request may, though need not, be in the request to build a new DAG; that is, it may be in a separate message (e.g., a maintenance message or polling message on an already built DAG). Further, the specific feedback request need not be sent by the DAG root, but may instead be sent by a network administrator or network management application, at which time the feedback may be reported back to the administrator, network management application, or to the DAG root, e.g., depending on default configuration or explicit instruction.

The feedback itself may comprise any relevant information regarding the DAG's OF, such as reporting the actual metrics (compliant or not), ability to meet certain constraints, requests for additional constraints, requests to relax particular constraints, or other information, such as number of parents, approximate time to construct the DAG, etc. Further, the devices of the DAG may determine various network statistics that may relate to the OF, such as packets handled, prefixes/routes managed, packet loss, etc., and such network statistics may also be included within the reported OF feedback 410. Note that the actual type of feedback (and not just feedback in general) may be specifically requested by the root device, or the feedback may be general based on certain configured policies. For instance, an example feedback by default may comprise inabilities to meet constraints, while a specifically requested feedback may comprise reports on link bandwidth, e.g., where bandwidth is a metric or constraint used in the OF. Moreover, it may be possible to consolidate feedbacks, such as a device receiving a feedback 410 from a downstream device may determine that the feedback is a duplicate of one the receiving device is prepared to send (e.g., carries the same information), and may either drop the received feedback if redundant, or may consolidate the feedback and indicate a combined feedback, such as "two devices have this complaint" (where the number "two" may be incremented for each subsequent upstream device also generating a same feedback).

The DAG root may eventually receive one or more reports 410 from devices of the DAG regarding OF feedback. Alternatively or in addition, the root device may itself determine various feedback metrics, such as network statistics, thus generating at least one of the received one or more reports regarding OF feedback, e.g., based on the network statistics. Upon receiving the feedback, the DAG root may decide whether to adjust the OF, accordingly. For instance, the root may determine a problem from the one or more reports, e.g., too many leaf nodes, and may also determine a solution to the problem, thus dynamically tuning the DAG's OF parameters, e.g., relaxing constraints on devices that can be routers (see example below). Note that a "problem" may consist of a single unsatisfactory feedback, or at least a set number of such feedbacks. In addition, a "problem" may also consist of detecting areas that may be improved upon, such as starting with a relaxed OF, and progressively making the OF stricter until reaching a configured point of optimization.

To reset the OF, the DAG root may adjust (e.g., change, add, remove, etc.) the one or more metrics and/or any optional constraints within the DAG based on the solution. For instance, to change metrics of a DAG's OF, the DAG root may select a new preferred metric or rearrange an order of a plurality of metrics. In one or more alternative embodiments, the DAG root may simply report the received feedback reports to a system administrator, and may then subsequently receive an adjusted OF from the system administrator.

FIG. 4B illustrates an example adjusted DAG 400b that differs from the initial DAG 400a of FIG. 4A. That is, once the DAG root requests that the devices of the initial DAG rebuild the DAG based on the adjusted OF, a new DAG 400b may be created. In addition, further feedback and further OF adjustments may be made over time, resulting in dynamically adjusted DAGs. Notably, it may be desirable to limit the amount of adjustments are made over time, or to put a limit on the time between adjustments. For instance, if adjusting the DAG in one direction based on a first set of complaints leads to an adjusted DAG that causes a second set of complaints, alternating between the two DAGs may be an unnecessary waste of resources. Accordingly, the dynamic adjustment of the DAG may cease after a certain number of adjustments (e.g., based on a strict number or a determination of a particular "best" DAG that ignores certain feedbacks and complaints). Note that it may also be possible for the DAG root to decide to ignore complaints from specific nodes that complain too often, e.g., placing the frequently complaining nodes within a "black list." Further, in the event DAG creation consumes a large amount of system resources that are more valuable elsewhere (e.g., collecting and/or reporting data), then the time between adjustments may be configured to alleviate the strain on the network. On the other hand, if DAG optimization is more important, the time may also be reduced.

The examples described below may further illustrate one or more of the embodiments herein, and may provide additional details. The examples are merely illustrative, and a vast myriad of possibilities are available to DAG-based computer networks utilizing the techniques described herein. The examples below, therefore, are not meant to limit the scope of the disclosure.

In a first example, the devices of the DAG may request changing the OF used to compute the DAG (e.g., adding metrics or a constraint). For instance, one of the prime objectives of smart metering is often to find reliable paths, with generally no real-time constraints on the delay. At the same time, however, emerging applications may impose certain delay bounds. Assuming than an original OF selected by the DAG root consists of optimizing the path reliability using, e.g., the Expected Transmission Count ("ETX") link metric (indicating how many packets on average are required to be sent before one reaches the next hop), this may lead to extremely reliable paths that may not meet the delay requirements known by the devices. In such a case, the nodes in the network could provide such feedback to the DAG root that would request an adaptation of the OF that includes delay/latency. Accordingly, a new OF may, instead of optimizing the path according to the reliability metric, add a reliability constraint (e.g., avoid poor quality links) and use delay as the relevant path metric upon which to build the DAG. In this example, notably, the initial metric used to build the DAG has been converted to a new constraint in the adjusted OF, and a new metric has been selected based on the feedbacks.

As a second example, a typical issue in LLNs is that links often become highly congested when getting closer to the sink (e.g., the root device). This may be a major concern in many networks since the entire network operation may be affected; that is, where most of the traffic is P2MP or MP2P, congestion in this part of the network may have a large impact on the overall network. Congestion can be easily detected by the DAG root using link layer statistics (e.g., collisions at the MAC layer), or even statistics at other layers, e.g., the routing layer. Note that this is an example of OF adjustment that need not rely on feedback from devices of the DAG other than the DAG root itself.

Figures 5A, 5B:
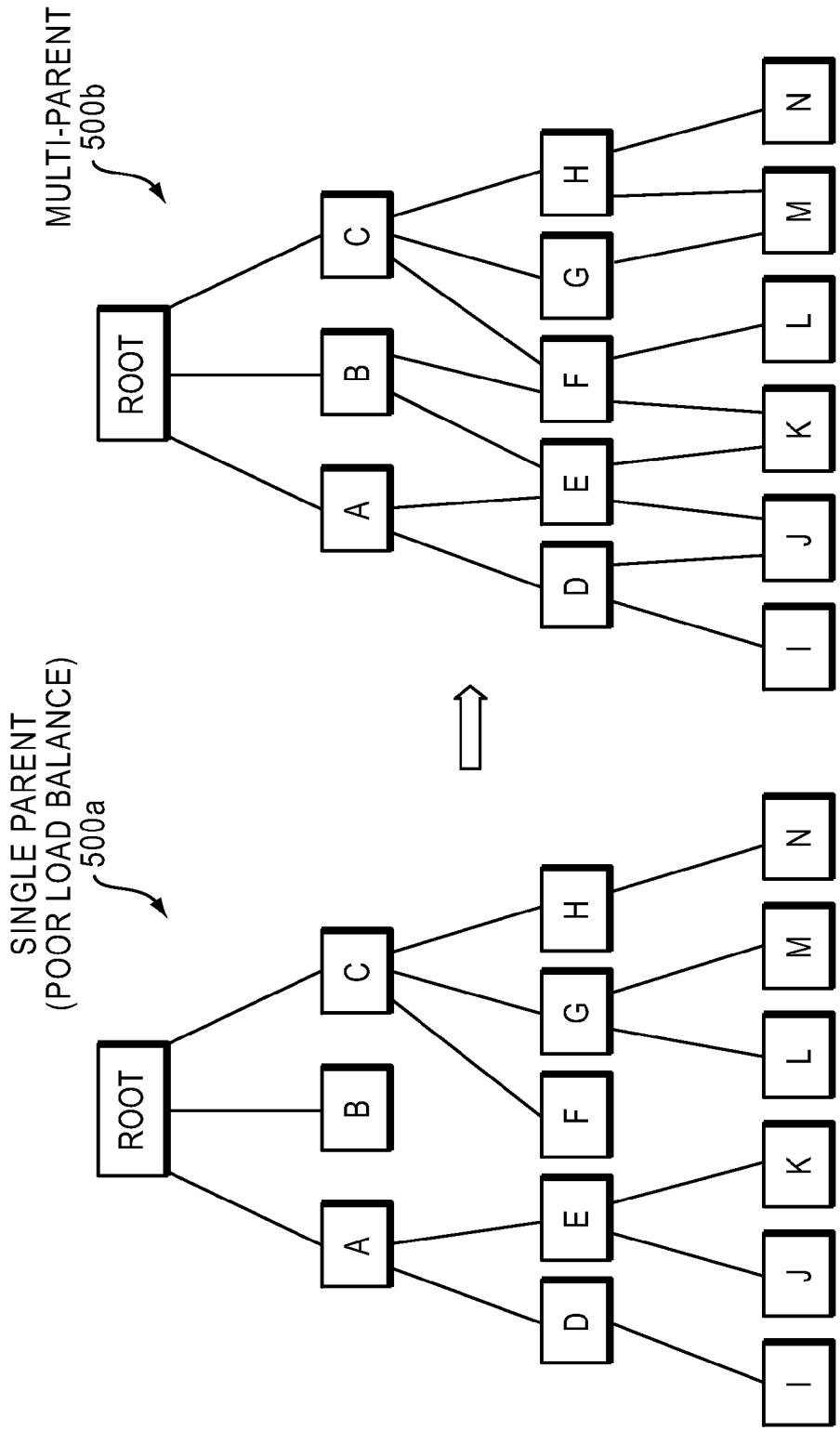
FIGS. 5A and 5B illustrate another example DAG adjustment.

If it is observed that the links are unequally loaded at the DAG root, the root can dynamically change the OF so as to increase the level of load balancing. For example, assume that an initial OF specifies or requires selection of a single parent that provides the best path according to some metric, an example of which illustrated by DAG 500a in FIG. 5A (e.g., where a majority of the traffic would be received on the Root-A or Root-C links). In this case, upon determining the network congestion (e.g., by the DAG root or by other devices within the network indicating as such through the feedback), the OF could request selection of a set of parents that provide additional paths (e.g., more meshing), as illustrated by adjusted DAG 500b in FIG. 5B. Notably, the OF may further specify in this situation that the plurality of selected parents must each have a particular metric that is within a threshold distance from a best particular metric of a selected parent. Said differently, the additional paths to the plurality of parents may be required to have costs (or other metrics) that fall within a certain range (e.g., cost of an addition path must be within a certain percent of the best known path). The additional paths in this manner would thus increase the degree of load balancing within the network, particularly beneficial in many situations on the links close to the DAG root.

Figure 6B:
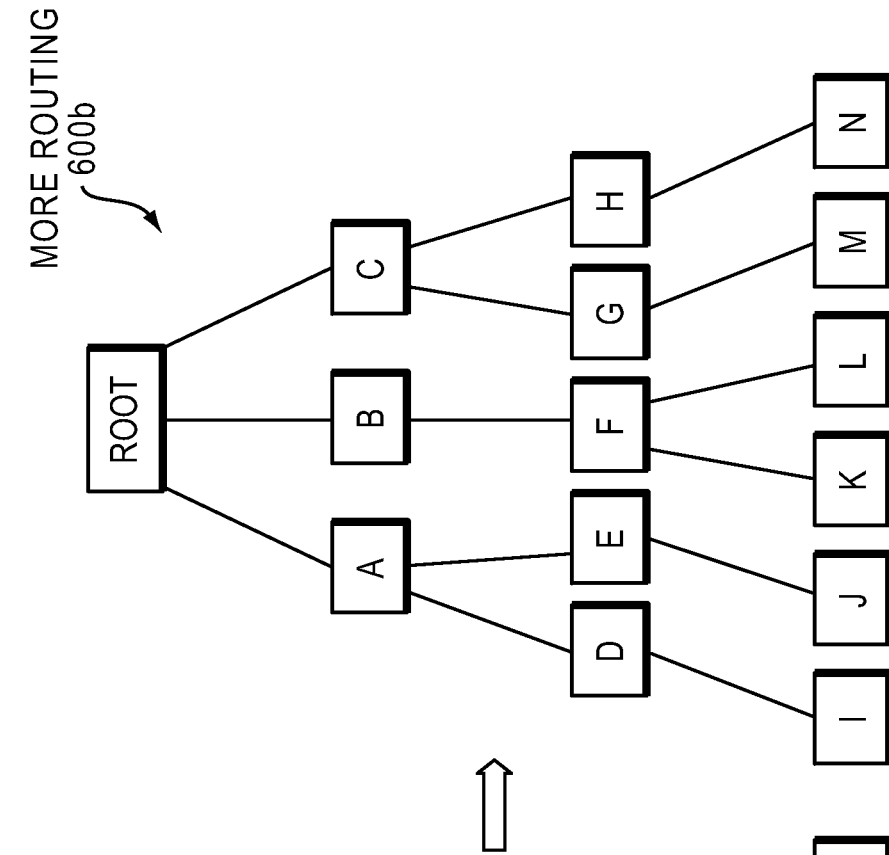
FIGS. 6A and 6B illustrate another example DAG adjustment.
Figure 6A:
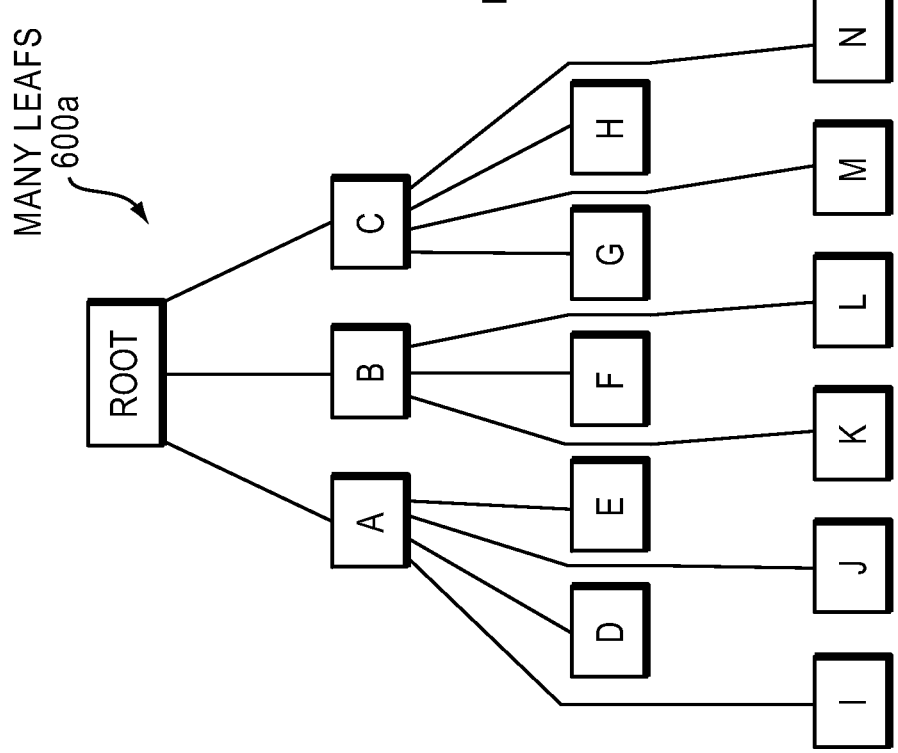

A third example relates to leaf-driven constraint relaxation. As mentioned, OFs allow specifying the set of routing metrics to optimize the DAG paths against, in addition to an optional set of routing constraints. Such constraints (e.g., avoiding battery operated devices) may lead to poor connectivity between devices. In particular, where certain classes of devices are unable to function as routing devices for not satisfying the constraint, such a device can only join the DAG as a leaf node, leading to a reduced connectivity graph. FIG. 6A illustrates an example DAG 600*a* with a high population of leaves (e.g., devices D-N). In this case, the device joining as a leaf (violating the constraint) can provide a feedback to the DAG root with an indication that the particular device is unable to comply with a particular constraint of the OF (e.g., it is a battery operated device). Upon receiving such feedbacks, and illustratively assuming the number received feedbacks is greater than some threshold (e.g., indicating that the DAG connectivity is too low), the DAG root may decide to modify the OF, e.g., relaxing constraints in the adjusted OF. FIG. 6B illustrates an example adjusted DAG 600*b* in response to the relaxed constraint (e.g., battery powered devices, at least devices D-H as shown, may act as routers, as well). Note that some devices may still remains as leaves after the adjustments, such as where other factors dictate the non-use as routers, or where it simply is not necessary (e.g., they are an end-point or destination, such as devices I-N).

Notably, the DAG devices may be unable to meet a plurality of constraints, such as where certain devices are unable to meet certain constraints (e.g., battery), other devices are unable to meet other constraints (e.g., latency), or certain devices are unable to meet a plurality of constraints (e.g., battery and latency), sending a list of the unmet constraints to the DAG root. In such a situation, the root device may be configured to relax all of the constraints (meeting a certain threshold of feedbacks), or may relax a highest unmet constraint. For instance, if most feedbacks indicate battery operated devices, while some fewer number indicate an inability to meet a latency requirement, then the DAG root may first relax the battery constraint. Other policies to select which constraints or metrics to adjust, singly or in combination, may also be used by the DAG root, and those described herein are merely illustrative.

In a fourth example situation, the DAG adjustment may actually comprise adjusting functionality of the DAG, and not the DAG shape itself. For instance, where timers are used by devices to determine how long to wait before performing a local repair (e.g., in order to avoid changing routes for a link/device that is only temporarily out of service), it may be beneficial to adjust the length of the timer. For example, if the timers are too long, then a high number of packets may be lost/dropped due to an inability to route them. Alternatively, if the timers are too short (aggressive), then overcorrection may occur, locally repairing a failed path quickly for essentially no reason, perhaps even where the failed path becomes available again shortly thereafter. As such, the feedbacks may include various statistics such as a number of packets dropped due to the timers (e.g., 0, 10, 20, 100, etc.), in which case the DAG root may adjust the timers (notably, not affecting the DAG shape) to lead the statistic in a direction that is acceptable. For example, the DAG root may shorten the timers to reduce the number of packets dropped from higher numbers, or may instead lengthen the timers (e.g., incrementally) until the number of packets dropped increases to an acceptable number (e.g., going from 0, possibly indication an overreacting timer, to 1, 2, 10, or other value that is determined to be an acceptable cost for optimizing the timers).

Figure 7:
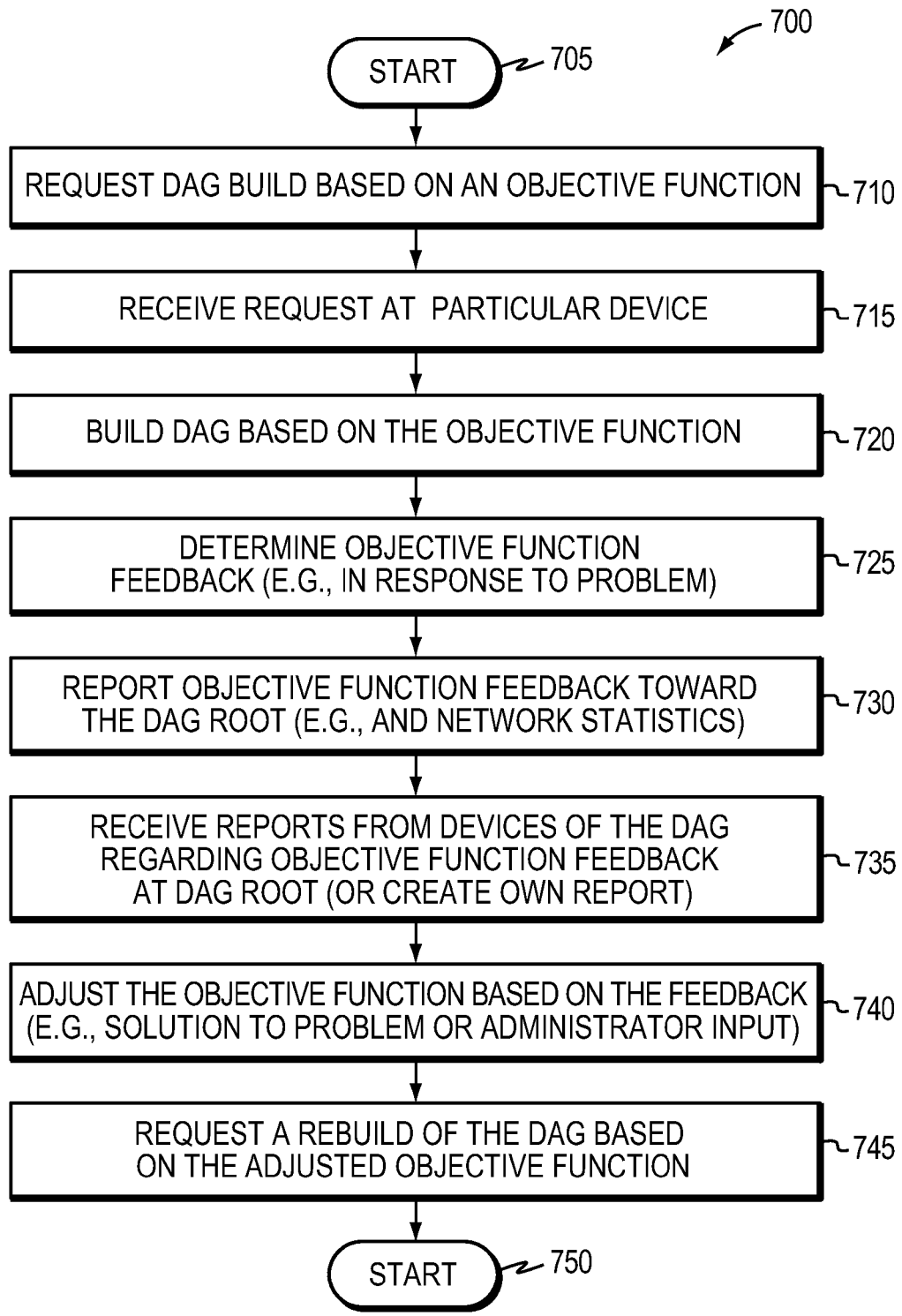
FIG. 7 illustrates an example procedure for dynamic DAG adjustment.

FIG. 7 illustrates an example simplified procedure for dynamically adjusting a DAG in accordance with one or more embodiments described herein. The procedure 700 starts at step 705, and continues to step 710, where a root node may request a DAG be built based on a certain objective function (OF), such as through transmission of a DAG discovery request 300 (e.g., DIO) having an illustrative objective code point field 329. The request may be received at each particular device of the network in step 715, and based on the OF, the particular device(s) may build the DAG in step 720, accordingly.

In step 725, each capable particular device may determine objective function feedback, such as various network metrics/statistics, ability or inability to meet certain restrictions, topology facts, specific requests to adjust the OF for the DAG, etc. Note that as mentioned above, the feedback may be generated by default or in response to a detected problem, such as an inability to meet constraints, metrics surpassing a threshold, and so on. In step 730, the particular node may report the objective function feedback toward the dag root (e.g., and network statistics), such as in a message 410 (e.g., a specific message or a subfield of another message, such as a DAO).

Upon receiving reports in step 735 from devices of the DAG regarding the objective function feedback (or after creating its own report, e.g., from known network statistics or topology), the DAG root may decide to adjust the objective function in step 740 based on the feedback. For instance, as mentioned above, the root node may apply local policies to determine a problem and a solution to the problem as a new/adjusted OF, or the root may report the feedback to a system administrator or external computer process, which may then provide a new/adjusted OF to the DAG root. If necessary, in step 745, the DAG root may request a rebuild of the DAG based on the adjusted OF, and the procedure 700 ends in step 750 (which, notably, may be considered as starting a new process at step 710 to request a DAG build based on an OF, which in this instance is the adjusted OF).

The novel techniques described herein dynamically adjust DAGs in a computer network. By providing a feedback mechanism from nodes in the DAG to the root, the novel techniques allow for dynamic adaptation of the DAG's shape (and thus routing topology) according to the network and traffic conditions. In other words, the techniques herein change the rules (OF) according to which the routing paths of a DAG are computed according to feedback received from the nodes or leaves of the DAG, or the observation of local phenomena (e.g., local link load) by the DAG root itself. In particular, the dynamic aspects of one or more embodiments described herein dramatically simplify the routing configuration and overall routing management of a DAG network, and alleviate the need for cumbersome and inefficient manual configuration. Further, by combining a distributed routing approach with a DAG-root based control of the DAG shape, the techniques above increase the routing control of root devices, e.g., "core" routers, as opposed to often low-end devices of the DAG, such as sensors.

While there have been shown and described illustrative embodiments that dynamically adjust DAGs in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not so limited, and may, in fact, be used with other types of networks and/or protocols utilizing DAG routing (e.g., distance vector protocols) utilizing objective functions or similar rule sets to create the DAGs.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   requesting, from a root device, that one or more devices of a computer network build a directed acyclic graph (DAG) for routing traffic within the computer network based on an objective function (OF), the OF having one or more metrics to optimize the DAG against and zero or more constraints;
   receiving one or more reports from devices of the DAG regarding OF feedback;
   adjusting the OF based on the feedback; and
   requesting a rebuild of the DAG from the devices based on the adjusted OF.

2. The method as in claim 1, wherein adjusting comprises:
   determining a problem from the one or more reports;
   determining a solution to the problem; and
   adjusting the one or more metrics and zero or more constraints based on the solution.

3. The method as in claim 1, further comprising:
   reporting the one or more reports to a system administrator; and
   receiving an adjusted OF from the system administrator.

4. The method as in claim 1, further comprising:
   determining network statistics by the root device; and
   generating at least one of the received one or more reports regarding OF feedback by the root device as a device of the DAG, wherein the OF feedback is based on the network statistics.

5. The method as in claim 1, wherein the received feedback includes an indication of network congestion.

6. The method as in claim 1, wherein a constraint of a first OF requires that a single parent be selected by each device of the DAG, and wherein an adjusted constraint of the adjusted OF requires that a plurality of parents be selected by each device of the DAG.

7. The method as in claim 6, wherein the OF specifies that the plurality of selected parents must each have a particular metric that is within a threshold distance from a best particular metric of a selected parent.

8. The method as in claim 1, wherein the received feedback includes a request for an added constraint.

9. The method as in claim 1, wherein the received feedback from a particular device includes an indication that the particular device is unable to comply with a particular constraint of the OF.

10. The method as in claim 9, further comprising:
    receiving a plurality of feedbacks from devices indicating inability to comply with a particular constraint; and
    in response to the plurality of feedbacks being greater than a threshold, relaxing the constraint in the adjusted OF.

11. The method as in claim 1, wherein the received feedback from a particular device is in response to the particular device encountering a problem.

12. The method as in claim 1, wherein the received feedback includes network statistics.

13. The method as in claim 1, wherein adjusting the OF comprises changing one or more of the metrics.

14. The method as in claim 13, wherein changing metrics comprises at least one of either selecting a new preferred metric or rearranging an order of a plurality of metrics.

15. The method as in claim 1, wherein adjusting the OF comprises at least one of either adding or removing constraints.

16. The method as in claim 1, wherein the one or more metrics are selected from a group consisting of: delay, latency, bandwidth, estimated transmission count (ETX), and cost.

17. The method as in claim 1, wherein the zero or more constraints comprise at least one constraint selected from a group consisting of: reliability thresholds, restricted battery operation, multipath diversity, load balancing requirements, bandwidth requirements, transmission types, and number of selected parents.

18. The method as in claim 1, further comprising:
    utilizing DAG routing according to a Routing Protocol for Low Power and Lossy Networks (RPL).

19. An apparatus, comprising:
    one or more network interfaces adapted to communicate with one or more devices of a computer network;
    a processor coupled to the network interfaces and adapted to execute one or more processes; and
    a memory adapted to store a process executable by the processor, the process when executed operable to:
        request that the one or more devices build a directed acyclic graph (DAG) for routing traffic within the computer network based on an objective function (OF), the OF having one or more metrics to optimize the DAG against and zero or more constraints;
        receive one or more reports from devices of the DAG regarding OF feedback;
        adjust the OF based on the feedback; and
        request a rebuild of the DAG from the devices based on the adjusted OF.

20. The apparatus as in claim 19, wherein the process when executed is further operable to:
    determine a problem from the one or more reports;
    determine a solution to the problem; and
    adjust the one or more metrics and zero or more constraints based on the solution.

21. A method, comprising:
    receiving a request, originated from a root device, at a particular device of a computer network, to build a directed acyclic graph (DAG) for routing traffic within the computer network based on an objective function (OF), the OF having one or more metrics to optimize the DAG against and zero or more constraints;
    building the DAG based on the OF;
    determining OF feedback; and
    reporting the OF feedback toward the root device.

22. The method as in claim 21, further comprising:
    determining the OF feedback in response to determining an encountered problem at the particular device.

23. The method as in claim 21, further comprising:
    determining network statistics at the particular device; and
    including the network statistics within the reported OF feedback.

24. An apparatus, comprising:
one or more network interfaces adapted to communicate with one or more devices of a computer network;
a processor coupled to the network interfaces and adapted to execute one or more processes; and
a memory adapted to store a process executable by the processor, the process when executed operable to:
  receive a request, originated from a root device, to build a directed acyclic graph (DAG) for routing traffic within the computer network based on an objective function (OF), the OF having one or more metrics to optimize the DAG against and zero or more constraints;
  build the DAG based on the OF;
  determine OF feedback; and
  report the OF feedback toward the root device.

* * * * *